C. A. PERKINS.
EGG CASE.
APPLICATION FILED JAN. 19, 1914.
1,130,840.
Patented Mar. 9, 1915.
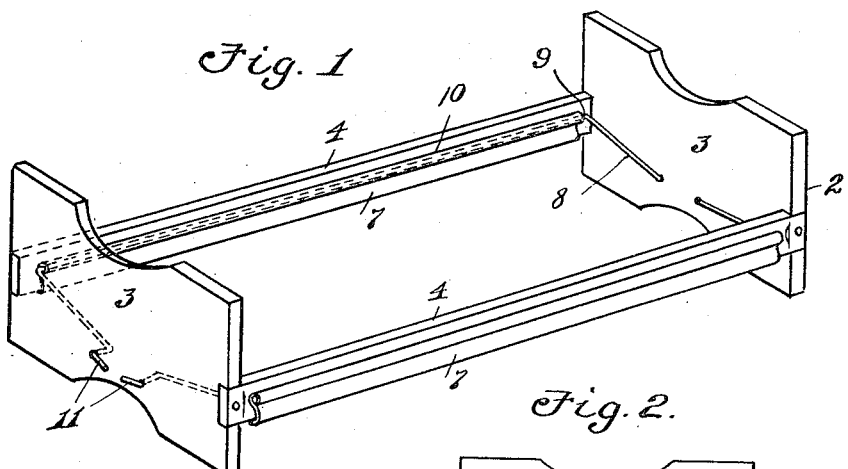
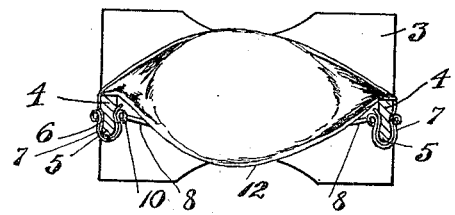
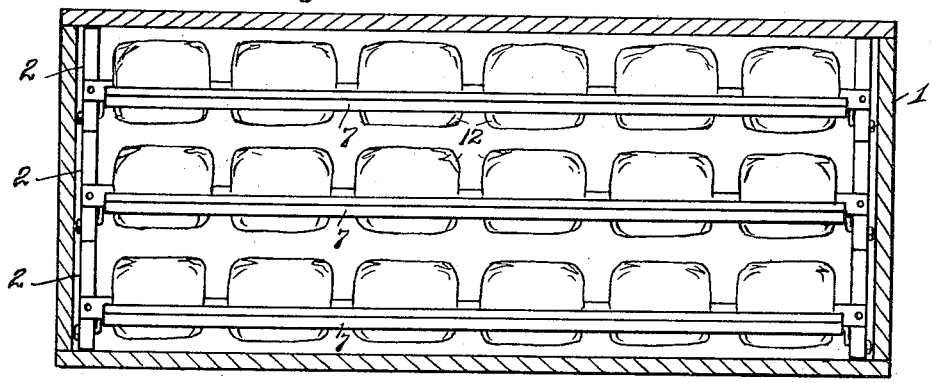
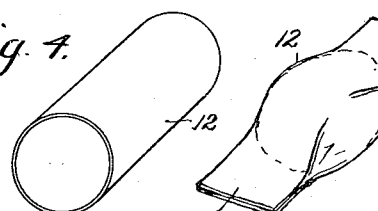
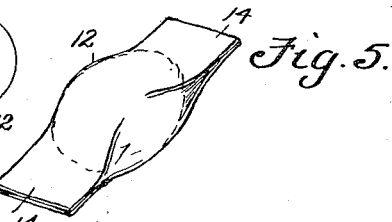
Witnesses:
Lela W. Cook.
Harry G. Hepner
Chester A. Perkins.
INVENTOR.
By George J. Oltsch
ATTORNEY

UNITED STATES PATENT OFFICE.

CHESTER A. PERKINS, OF SOUTH BEND, INDIANA.

EGG-CASE.

1,130,840.  Specification of Letters Patent.  Patented Mar. 9, 1915.

Application filed January 19, 1914. Serial No. 812,882.

*To all whom it may concern:*

Be it known that I, CHESTER A. PERKINS, a citizen of the United States, residing at South Bend, in the county of St. Joseph and State of Indiana, (post-office address 1915 Prairie avenue, South Bend, Indiana,) have invented certain new and useful Improvements in Egg-Cases, of which the following is a specification.

The invention relates to an improved egg case wherein provision is made for sustaining the eggs in a completely isolated, independent, and protected relation, the specific improvement relating to a means for fixing the independent egg carriers within the case, and to this extent being contemplated for use in connection with the egg carrier forming the subject-matter of a co-pending application filed by me January 19, 1914, Serial Number 812,881.

The main object of the present invention is the provision of auxiliary holding means adapted in operation to engage the collapsed ends of the egg carriers and secure them to the case sections.

The invention in the preferred form of details will be described in the following specification, reference being had particularly to the accompanying drawings, in which:—

Figure 1 is a perspective view of one of the sections of the improved case. Fig. 2 is a transverse section of the same, an egg carrier and contained egg being shown in position. Fig. 3 is an elevation of the completed egg case, the cover section being shown in section. Fig. 4 is a perspective view of the independent egg carrier in original condition. Fig. 5 is a similar view showing the ends of the carrier collapsed, after insertion of the egg.

In the present type of egg shipping case, I have shown the same to include a box-like cover section 1, provided with a lid and other necessary parts to form a complete inclosing case. Arranged within and adapted for convenient removal from such inclosing case are a plurality of carrier sections 2, each including end walls 3 and side strips 4 connecting the end walls. The side strips are of materially less height than the similar dimension of the end walls, and are tenoned in the latter to provide a rigid structure, said strips being arranged intermediate the top and bottom of the end walls and preferably more nearly adjacent the bottom than the top. The bottom edge of each strip 4 is rounded as at 5 and the side walls recessed at 6, the bottom of the recess forming a continuation of the rounded bottom edge 5, the purpose being to provide a fixed interlocking section having a lower edge of slightly greater transverse dimension than the intermediate portion thereof.

The clamp 7 is arranged to coöperate with the interlocking portion of the strip 4, said clamp comprising a suitable length of metal strip, preferably resilient, adapted in its locking coöperation with the strip 4 to be sprung upwardly over the lower edge of such strip, as will be apparent from Fig. 2. Each clamp is movably supported on the section 2 through the medium of pivotally mounted rods 8 having their main length 9 loosely mounted in a coil or roll 10 formed on the upper inner edge of the clamps, the terminals of the rods being projected transverse the end walls 3 of the section through apertures therein, and having their terminal ends 11 bent parallel with the outer surface of the end walls to prevent displacement thereof, as clearly shown in Fig. 1. By this means the clamps are held in attached relation with the section as a whole and in proper position to be swung upwardly into engagement with the strips 4, the yielding opposite free edges of the clamps exerting a binding engagement with the strips when forced to position, and which may be readily separated therefrom by downward pressure, as will be obvious.

The egg carrier is identical with that described in the application above referred to, comprising a tube-like element 12, preferably of oiled paper or other flexible material, which, following the insertion of the egg therein, is adapted to have its ends collapsed or compressed to form supporting terminals 14. The carrier sections, of which there may be any number, are adapted to independently carry a number of eggs, each inclosed in its carrier.

The eggs are applied with the supporting ends 14 of the carrier overlying the upper surface of the strips 4 of a particular section, said ends being bent around the lower edge of the strip, and upwardly on the inner side thereof. The clamps 7 which have been previously depressed from coöperation with the strips, are then moved upwardly and forced into embracing coöperation with the formed portion of the strip, the supporting section 14 of the carrier being held between the clamp and strip, all as clearly illustrated in Fig. 2 of the drawings. The carrier sections in the present instance, are shown as designed for supporting six eggs, though it is of course obvious that they may be adapted for any number.

The sections are arranged in superimposed relation in the case and from the drawings, it will be obvious that with the eggs supported thereon as described, each egg is supported independent of every other egg, free of contact with any or all surfaces liable to injure the eggs in transportation, and with each egg independently sealed.

What is claimed is:—

1. An egg case including a carrier section comprising end walls and side strips, clamps carried by the section for removable coöperation with the strips, and flexible egg carriers having portions adapted to be interposed between the clamps and strips, whereby to support the carriers intermediate the strips.

2. An egg case including a carrier section comprising end walls and side strips, clamps carried by the section for coöperation with the strips from beneath, and egg carriers adapted to partially surround the strips and be secured thereto by the clamps.

3. An egg case including a carrier section comprising end walls and side strips, clamps movably supported by the end walls for coöperation with the lower edges of the strips, and egg carriers having flattened flexible ends adapted to partly surround the strips and be secured thereto by the clamps.

In testimony whereof I affix my signature in presence of two witnesses.

CHESTER A. PERKINS.

Witnesses:
EDW. H. LAMBERT,
CHARLES W. VAN BUREN.

Copies of this patent may be obtained for five cents each, by addressing the "Commissioner of Patents, Washington, D. C."